United States Patent [19]

Ward

[11] Patent Number: 5,350,501
[45] Date of Patent: Sep. 27, 1994

[54] HYDROCRACKING CATALYST AND PROCESS

[75] Inventor: John J. Ward, Yorba Linda, Calif.

[73] Assignee: Union Oil Company of California, Los Angeles, Calif.

[21] Appl. No.: 663,242

[22] Filed: Feb. 28, 1991

Related U.S. Application Data

[63] Continuation-in-part of Ser. No. 527,125, May 22, 1990, abandoned.

[51] Int. Cl.$^5$ .............................................. C10G 47/20
[52] U.S. Cl. ...................................... 208/111; 208/108
[58] Field of Search ......................................... 208/111

[56] References Cited

U.S. PATENT DOCUMENTS

| | | | |
|---|---|---|---|
| Re. 28,341 | 2/1975 | Wadlinger et al. | 208/120 |
| 3,130,007 | 4/1964 | Breck | 23/113 |
| 3,132,087 | 5/1964 | Kelley et al. | 208/60 |
| 3,159,564 | 12/1964 | Kelley et al. | 208/59 |
| 3,655,551 | 4/1972 | Hass et al. | 208/59 |
| 3,897,327 | 7/1975 | Ward | 208/111 |
| 3,923,641 | 12/1975 | Morrison | 208/111 |
| 3,929,672 | 12/1975 | Ward | 252/455 Z |
| 4,028,227 | 6/1977 | Gustafson | 208/216 |
| 4,040,944 | 8/1977 | Kelley et al. | 208/89 |
| 4,312,744 | 1/1982 | Tu et al. | 208/120 |
| 4,357,265 | 11/1982 | Chiang | 208/120 |
| 4,401,556 | 8/1983 | Bezman et al. | 208/111 |
| 4,419,271 | 12/1983 | Ward | 502/65 |
| 4,429,053 | 1/1984 | Ward | 502/65 |
| 4,457,833 | 7/1984 | Zandona et al. | 208/120 |
| 4,477,336 | 10/1984 | Scherzer | 208/120 |
| 4,486,296 | 12/1984 | Olek et al. | 208/111 |
| 4,534,853 | 8/1985 | Long et al. | 208/120 |
| 4,568,655 | 2/1986 | Olecketal | 208/216 R |
| 4,588,496 | 5/1986 | Scherzer | 208/120 |
| 4,601,993 | 7/1986 | Chu et al. | 502/66 |
| 4,612,108 | 9/1986 | Angevine et al. | 208/111 |
| 4,676,887 | 6/1987 | Fischer et al. | 208/61 |
| 4,740,292 | 4/1988 | Chen et al. | 208/120 |
| 4,756,822 | 7/1988 | Chen et al. | 208/111 |
| 4,795,549 | 1/1989 | Coughlin et al. | 208/139 |
| 4,812,223 | 3/1989 | Hickey, Jr. et al. | 208/111 |
| 4,816,538 | 3/1989 | Abdo | 502/66 |
| 4,837,396 | 6/1989 | Herbst et al. | 502/67 |
| 4,840,724 | 6/1989 | Groenenboom et al. | 208/120 |
| 4,867,861 | 9/1989 | Abdo et al. | 208/27 |
| 4,891,458 | 1/1990 | Innes et al. | 585/323 |
| 4,894,142 | 1/1990 | Steigleder | 208/111 |
| 4,898,846 | 2/1990 | Edwards et al. | 502/67 |
| 4,911,823 | 3/1990 | Chen et al. | 208/67 |
| 4,913,799 | 4/1990 | Gortsema et al. | 208/111 |
| 4,916,096 | 4/1990 | Hoek et al. | 502/66 |
| 4,960,505 | 10/1990 | Minderhoud et al. | 208/111 |
| 4,983,274 | 1/1991 | Chen et al. | 208/111 |
| 4,985,384 | 1/1991 | Gilson | 502/61 |
| 5,047,139 | 9/1991 | Gortsema et al. | 208/111 |
| 5,100,535 | 3/1992 | Chen et al. | 208/111 |

FOREIGN PATENT DOCUMENTS

| | | | |
|---|---|---|---|
| 0140608 | 5/1985 | European Pat. Off. | B01J 29/06 |
| 0243629 | 11/1987 | European Pat. Off. | C10G 11/05 |
| 2014970 | 9/1979 | United Kingdom | C01B 33/28 |

*Primary Examiner*—Helane Myers
*Attorney, Agent, or Firm*—Yale S. Finkle; Gregory F. Wirzbicki

[57] ABSTRACT

A composition of matter comprising both (1) zeolite Beta and a (2) Y zeolite having either a unit cell size below about 24.45 angstroms or a water vapor sorption capacity at 25° C. at $p/p_o$ of 0.10 of less than 10.00 weight percent. Typical of the Y zeolites used in the composition of the invention is a UHP-Y zeolite such as LZ-10 zeolite. The composition is especially suited for use in combination with one or more hydrogenation components as a catalyst for hydrocracking various types of feedstocks to produce either gasoline or middle distillate products.

38 Claims, No Drawings

HYDROCRACKING CATALYST AND PROCESS

CROSS-REFERENCES TO RELATED APPLICATIONS

This application is a continuation-in-part of U.S. patent application Ser. No. 527,125, filed in the U.S. Patent and Trademark Office on May 22, 1990 now abandoned. The disclosure of this application is herein incorporated by reference in its entirety.

BACKGROUND OF THE INVENTION

The invention relates to acid catalyzed chemical conversion processes, such as hydrocarbon conversion processes, and to the catalysts and catalyst supports used in such processes. The invention is particularly concerned with catalyst supports containing a combination of two zeolites, catalysts comprising such supports and the use of such catalysts in hydrocarbon conversion processes, particularly hydrocracking.

Petroleum refiners often produce desirable products, such as gasoline and turbine fuel, by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with a suitable hydrocracking catalyst under appropriate conditions, including an elevated temperature and an elevated pressure and the presence or hydrogen, such that a hydrocarbon product is obtained containing a substantial portion of a desired product boiling in a specified range, as for example, a heavy gasoline boiling in the range of 185° to 420° F.

Oftentimes, hydrocracking is performed in conjunction with hydrotreating, usually by a method referred to as "integral operation." In this process, the hydrocarbon feedstock, usually a gas oil containing a substantial proportion of components boiling above a desired end point, as for example, 420° F. in the case of certain gasolines, is introduced into a catalytic hydrotreating zone wherein, in the presence of a suitable catalyst, such as a zeolite- or sieve-free, particulate catalyst comprising a Group VIII metal component and a Group VIB metal component on a porous, inorganic, refractory oxide support most often composed of alumina, and under suitable conditions, including an elevated temperature (e.g., 400° to 1000° F.) and an elevated pressure (e.g., 100 to 5000 p.s.i.g.) and with hydrogen as a reactant, the organonitrogen components and the organosulfur components contained in the feedstock are converted to ammonia and hydrogen sulfide, respectively. Subsequently, the entire effluent removed from the hydrotreating zone is treated in a hydrocracking zone maintained under suitable conditions of elevated temperature, pressure, and hydrogen partial pressure, and containing a suitable hydrocracking catalyst, such that a substantial conversion of high boiling feed components to product components boiling below the desired end point is obtained. Usually, the hydrotreating and hydrocracking zones in integral operation are maintained in separate reactor vessels, but, on occasion, it may be advantageous to employ a single, downflow reactor vessel containing an upper bed of hydrotreating catalyst particles and a lower bed of hydrocracking particles. Examples of integral operation may be found in U.S. Pat. Nos. 3,132,087, 3,159,564, 3,655,551, and 4,040,944, all of which are herein incorporated by reference in their entireties.

In some integral operation refining processes, and especially those designed to produce gasoline from the heavier gas oils, a relatively high proportion of the product hydrocarbons obtained from integral operation will have a boiling point above the desired end point. For example, in the production of a gasoline product boiling in the $C_4$ to 420° F. range from a gas oil boiling entirely above 570° F., it may often be the case that as much as 30 to 60 percent by volume of the products obtained from integral operation boil above 420° F. To convert these high boiling components to hydrocarbon components boiling below 420° F., the petroleum refiner separates the 420° F.+ high boiling components from the other products obtained in integral operation, usually after first removing ammonia by a water washing operation, a hydrogen-containing recycle gas by high pressure separation, and an $H_2S$-containing, $C_1$ to $C_3$ low BTU gas by low pressure separation. This 420° F.+ boiling bottom fraction is then subjected to further hydrocracking, either by recycle to the hydrocracking reactor in single stage operation or by introduction into a second hydrocracking zone wherein yet more conversion to the desired $C_4$ to 420° F. product takes place.

In the foregoing two stage process, the two hydrocracking reaction zones often contain hydrocracking catalysts of the same composition. One catalyst suitable for such use is disclosed as Catalyst A in Example 16 of U.S. Pat. Nos. 3,897,327 and 3,929,672, both of which are herein incorporated by reference in their entireties, which catalyst is comprised of a palladium-exchanged, steam-stabilized Y zeolite hydrocracking component. But although the catalysts used in the two hydrocracking reaction zones may have the same composition and the same catalytic properties, the hydrocracking conditions required in the second hydrocracking reaction zone are less severe than those required in the first. The reason for this is that ammonia is not present in the second hydrocracking reaction zone (due to water washing) whereas a significant amount of ammonia is present in the first hydrocracking zone. To account for the difference in operating conditions, it is believed that ammonia neutralizes or otherwise interferes with the acidity of the zeolite in the catalyst of the first reaction zone, thereby forcing the refiner to employ relatively severe conditions for operation, as for example, increased temperature. On the other hand, in the ammonia-deficient atmosphere of the second hydrocracking reaction zone, high conversions to the desired product are obtainable under relatively moderate conditions, often with an operating temperature about 100° to 210° F. lower than that required in the first hydrocracking reaction zone.

Further description of two-stage hydrocracking operations may be found in U.S. Pat. Nos. 4,429,053 and 4,857,169 herein incorporated by reference in their entireties, which patents provide process flow sheets for typical two-stage hydrocracking processes.

Although there exist several types of commercial hydrocracking catalysts which can be used effectively in single stage hydrocracking or either the first, second or both stages of the above-discussed two-stage hydrocracking process, there is always a demand for new catalysts with superior overall activity, selectivity and stability for producing gasoline or middle distillate products, such as turbine and diesel fuels, via hydrocracking.

SUMMARY OF THE INVENTION

The present invention provides a composition for use in the acid catalyzed chemical conversion of feedstocks containing organic compounds into reaction products, particularly in the acid catalyzed conversion of hydrocarbons and most especially in hydrocracking. The composition, which may be a catalyst and/or catalyst support, comprises both zeolite Beta and a Y zeolite having either a unit cell size below about 24.45 angstroms or a water vapor sorption capacity at 25° C. and a $p/p_o$ value of 0.10 of less than 10.00 weight percent, the zeolites usually and preferably being in further combination with a porous, inorganic refractory oxide such as alumina. For hydrocracking purposes, the catalyst requires a hydrogenation component, such as one or more Group VIB or Group VIII metal components, the hydrogenation components generally being dispersed on the support material composed of the two zeolites and one or more porous, inorganic refractory oxides. As used herein "$p/p_o$" represents the water vapor partial pressure to which the Y zeolite is exposed divided by the water vapor partial pressure at 25° C.

Preliminary tests indicate that the catalyst supports of the invention, when used in combination with metal hydrogenation components to produce gasoline via hydrocracking, have a higher activity and selectivity for light gasoline and turbine fuel, both for first stage (in the presence of $NH_3$) and second stage (in the substantial absence of $NH_3$) hydrocracking, as compared to a hydrocracking catalyst now commercially available for use in gasoline hydrocracking processes. Tests also indicate that the compositions of the invention, when used to produce middle distillate products via hydrocracking, have a higher activity and selectivity in single stage (in the presence of $NH_3$) hydrocracking, as compared to a commercial hydrocracking catalyst designed to maximize middle distillate yields.

DETAILED DESCRIPTION OF THE INVENTION

The present invention is directed to novel catalysts and/or catalyst supports and novel acid catalyzed chemical conversion processes employing such catalysts to promote the desired reactions. The present invention is particularly directed to hydrocracking catalysts, and hydrocracking processes employing such catalysts, comprising a hydrogenation component(s) on a support comprising a Beta zeolite and a Y zeolite such as a UHP-Y zeolite.

Zeolite Beta is a crystalline zeolite whose composition and X-ray powder diffraction analysis are disclosed in U.S. Pat. No. Re. 28,341, herein incorporated by reference in its entirety. This zeolite is a large pore zeolite having a pore size above 7.0 angstroms and a Constraint Index below 2, preferably between 0.6 and 1.0. The Constraint Index of a zeolite is a convenient measure of the extent to which a zeolite provides access to molecules of varying sizes to its internal structure. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,0167,218, the disclosure of which is herein incorporated by reference in its entirety.

Zeolite Beta is prepared, in general, as an aluminosilicate zeolite having a silica-to-alumina molar ratio ($SiO_2$:$Al_2O_3$) of at least 10 up to about 100, but preferably no more than about 40, and most preferably in the range of 20 to 30. It may also be prepared in yet higher silica-to-alumina mole ratios, e.g., 500:1 or more, and although such materials may have little or no zeolitic properties, it is to be understood that, in the present invention, the term "zeolite Beta" is meant to encompass such materials. The preferred zeolite Betas have a crystal size of about 0.1 to 0.7 $\mu$m, a surface area of about 500 to 800, preferably 650 to 750, and most preferably 700 to 750 $m^2$/gm, and a cyclohexane adsorption capacity of about 15 to 25 g/100 g.

As initially prepared, zeolite Beta is usually in the alkali metal form and contains an organic templating agent. In this form, the zeolite has little if any catalytic activity for promoting acid catalyzed conversion reactions, e.g., cracking reactions. Accordingly, the zeolite is generally converted to more active forms, generally by base exchange with ammonium cations to substantially reduce the alkali metal content, followed by calcination to decompose the organic templating agent and convert the zeolite to the hydrogen form. Alternatively, the zeolite may be calcined first to drive off the templating agent, followed by ammonium ion exchange and another calcination to convert the zeolite to the hydrogen form. For zeolite Betas initially prepared in the sodium form, the preferred sodium content upon conversion to an active form is below 1.0 percent by anhydrous weight, preferably below about 0.5 percent by anhydrous weight, calculated as $Na_2O$.

Publications which further discuss the properties of zeolite Beta include U.S. Pat. Nos. 3,923,641, 4,676,887, 4,812,223, 4,486,296, 4,601,993, and 4,612,108, all of which are herein incorporated by reference in their entireties.

Also included in the catalyst used in the present invention is a Y zeolite having either (1) a unit cell size less than about 24.45 angstroms or (2) a sorptive capacity for water vapor at 25° C. and a $p/p_o$ value of 0.10 of less than 10.00 weight percent, preferably less than 5.00 weight percent. Preferred Y zeolites meet both of the foregoing requirements. The term "Y zeolite" as employed herein is meant to encompass all crystalline zeolites having either the essential X-ray powder diffraction pattern set forth in U.S. Pat. No. 3,130,007 or a modified Y zeolite having an X-ray powder diffraction pattern similar to that of U.S. Pat. No. 3,130,007 but with the d-spacings shifted somewhat due, as those skilled in the art will realize, to cation exchanges, calcinations, etc., which are generally necessary to convert the zeolite into a catalytically active and stable form. The present invention requires a Y zeolite having either or both of the two properties mentioned above, such Y zeolites being modified Y zeolites in comparison to the Y zeolite taught in U.S. Pat. No. 3,130,007.

The Y zeolites used in the catalyst of the invention are large pore zeolites having an effective pore size greater than 7.0 angstroms. Since some of the pores of the Y zeolites are relatively large, the zeolites provide molecules relatively free access to their internal structure. Thus, the Y zeolites useful in the composition of the invention will generally have a low Constraint Index, typically below 1.0, preferably below 0.75, and usually below about 0.5.

Among the Y zeolites suitable for use in the invention is that disclosed in U.S. Pat. No. 4,916,096, herein incorporated by reference in its entirety. However, this zeolite is not preferred. The preferred Y zeolite is a UHP-Y zeolite, an ultrahydrophobic Y zeolite, the composition and properties of which are disclosed in U.S. Pat. No. 4,401,556 herein incorporated by reference in its entirety. See also U.S. Pat. No. 4,795,549 and Great Britain Patent 2 014 970 B both of which are also herein incorporated by reference in their entireties. UHP-Y zeolites are, in essence, produced by a four step procedure in which a Y zeolite in the alkali metal form (usually sodium) and typically having a unit cell size of about 24.65 angstroms is cation exchanged with ammonium ions, calcined in the presence of water vapor (preferably in the presence of at least 0.2 psia water vapor, even more preferably at least 1.0 psia water vapor, and more preferably still at least, 10 psia water vapor, and most preferably of all, an atmosphere consisting essentially of or consisting of steam) so as to produce a unit cell size in the range of 24.40 to 24.64 angstroms, preferably 24.42 to 24.62 angstroms, then ammonium exchanged once again, and then calcined again in the presence of sufficient water vapor (preferably in an atmosphere consisting essentially of steam, and most preferably consisting of steam) so as to yield a unit cell size below 24.40, and most preferably no more than 24.35 angstroms. It will be seen, therefore, that UHP-Y zeolites differ from the Y zeolite taught in U.S. Pat. No. 3,929,672 by the addition of the final steam calcination step, the zeolite of said patent being known under the designations Y-82 or LZY-82 and Y-84 or LZY-84. Y-82 and Y-84 zeolites may be produced by the first three steps just mentioned, but optionally one may include a further calcination step in a dry atmosphere, e.g., a calcination in water- and steam-free air, at 900° F. or higher.

"UHP-Y" zeolites are defined herein as zeolite aluminosilicates having a $SiO_2/Al_2O_3$ molar ratio greater than 4.5, the essential X-ray powder diffraction pattern of zeolite Y, an ion exchange capacity of not greater than 0.070 relative to NaY, a unit cell size or dimension $a_o$ of less than 24.45 angstroms, a surface area of at least 300 m²/g (B-E-T), a sorptive capacity for water vapor at 25° C. and a $p/p_o$ value of 0.10 of less than 10.00 weight percent, and a Residual Butanol Test value of not more than 0.40 weight percent. Preferred UHP-Y zeolites have one or more of the following properties: a $SiO_2/Al_2O_3$ molar ratio from 4.5 to 35, a surface area of at least 350 m²/gm, and a sorptive capacity for water vapor at 25° C. and a $p/p_o$ value of 0.10 of less than 5.00 weight percent. Especially preferred are UHP-Y zeolites having a $SiO_2:Al_2O_3$ molar ratio of 4.5 to 9 and/or a sorptive capacity for water vapor at 25° C. and a $p/p_o$ value of 0.10 of less than 4.00 weight percent. UHP-Y zeolites that have been treated with a mineral acid to remove aluminum and thereby increase their overall silica-to-alumina molar ratio may also be used.

The more preferred UHP-Y zeolites for use in the present invention have a unit cell size or dimension less than about 24.40 angstroms, and even more preferably no more than 24.35 angstroms. LZ-10 zeolite is the most preferred UHP-Y zeolite, LZ-10 zeolite being available from UOP. LZ-10 zeolite usually has a unit cell size or dimension at or above 24.20 angstroms, preferably between 24.20 and 24.40, and most preferably between about 24.25 and 24.35 angstroms, and has a water vapor sorption capacity at 4.6 mm water vapor partial pressure and 25° C. less than 8.0 percent by weight of the zeolite. See U.S. Pat. No. 4,419,271 herein incorporated by reference in its entirety.

At present, it is preferred that the catalyst and/or catalyst support of the invention contain, in addition to amorphous, inorganic refractory oxide components, only the zeolites described above, i.e., the Beta zeolite and the Y zeolite of unit cell size less than 24.40 angstroms or of water vapor sorption capacity at 25° C. and a $p/p_o$ value of 0.10 of less than 10.00 weight percent. Preferably, the catalyst and/or catalyst support will be devoid of any other zeolites (zeolitic molecular sieve) or nonzeolitic molecular sieves, including those sieves having pores of intermediate or small size, i.e., below 7.0 angstroms, which are not defined by 12-membered rings of oxygen atoms, and sieves having a large pore size such as rare earth-exchanged Y zeolites, ultrastable Y zeolites, ZSM-4 zeolite, ZSM-18 zeolite and ZSM-20 zeolite. However, in alternative but non-preferred embodiments of the invention, other zeolites or nonzeolitic molecular sieves may also be present. The term "molecular sieve" as used herein refers to any material capable of separating atoms or molecules based on their respective dimensions. Molecular sieves include zeolites, microporous carbons, porous membranes, aluminas and the like. The term "pore size" as used herein refers to the diameter of the largest molecule that can be sorbed by the particular molecular sieve in question. The measurement of such diameters and pore sizes is discussed more fully in Chapter 8 of the book entitled *Zeolite Molecular Sieves* written by D. W. Breck and published by John Wiley & Sons in 1974, the disclosure of which book is hereby incorporated by reference in its entirety. The term "nonzeolitic" as used herein refers to molecular sieves whose frameworks are not formed of substantially only silicon and aluminum atoms in tetrahedral coordination with oxygen atom. "Zeolitic" molecular sieves are distinguished from nonzeolitic molecular sieves in that their frameworks are formed of substantially only silicon and aluminum atoms in tetrahedral coordination with oxygen atoms, such as the frameworks present in ZSM-5 zeolites, Y zeolites and X zeolites.

The stability and/or acidity of either or both of the two zeolites used in the catalyst and/or catalyst support of the invention may be increased by exchanging the zeolite with ammonium ions, thereby lowering the alkali metal content until it is less than about 0.8 weight percent, preferably less than about 0.5 weight percent, and most preferably less than about 0.3 weight percent, calculated as the monoxide. Methods of carrying out the ion exchange are well known in the art. It is normally preferred that both zeolite components of the catalyst and/or catalyst support be substantially free of rare earth components.

The two zeolites required in the catalyst and/or catalyst support of the invention are embodied into particles which contain both zeolites. In the preferred method, this is accomplished by combining the zeolites with a material, such as an alumina hydrogel, which, upon calcination, will yield a porous, inorganic refractory oxide or with a material which itself is a porous inorganic refractory oxide, for example, alumina, silica-alumina, silica-magnesia, and clays such as kaolin, as well as combinations of such materials. Perhaps the most convenient method for physically integrating the two zeolites into individual particulates is to comull a porous, inorganic refractory oxide (e.g., alumina) with the two zeolites, and subsequently extruding the comulled material through a die having small openings therein of desired cross-sectional size and shape, e.g., circle, trilobal clover-leaf, quadrolobal clover leafs, etc., breaking or cutting the extruded matter into appropriate lengths, e.g., ⅛ to ¾ inch, drying the extrudates, and then calcining at a temperature, e.g., 900° F. or higher, to produce a material suitable for use as a catalyst or as a catalyst component for use in high temperature chemical conversion reactions. At present it is preferred that the catalyst be produced in cylindrical form; however, as stated above, other cross-sectional shapes are possible, such as cloverleafs of polylobal design, for example, trilobal or quadrolobal shapes, as shown, for example, in FIGS. 8 and 10, respectively, in U.S. Pat. No. 4,028,227 herein incorporated by reference in its entirety.

It will be understood, of course, in the foregoing description that the porous, inorganic refractory oxide (e.g., Catapal ® alumina) is used as a binder material to hold the zeolites together in the support, and accordingly, if desired, other materials can also be incorporated into the comulled mixture, including for example, inorganic refractory oxide diluents which may or may not possess some type of catalytic activity. An example of such a diluent is the heterogeneous dispersion of finely divided silica-alumina in an alumina matrix described in detail in U.S. Pat. Nos. 4,097,365 and 4,419,271, the disclosures of which are herein incorporated by reference in their entireties. These dispersions are preferably used in the catalysts of the invention when it is desired to use the catalysts to selectively produce middle distillate products via hydrocracking. Additionally and alternatively, hydrogenation component precursors can also be comulled into the mixture, as will be discussed in more detail hereinafter.

It will be further understood that producing the catalyst and/or catalyst support of the invention in extrudate form, while certainly the most highly preferred method, is still but one option available to those skilled in the art. The catalyst and/or its support may also be produced in tablet, granules, spheres, and pellets, as desired, by any known method for combining other zeolites with a porous, inorganic refractory oxide component.

The catalyst of the invention can be used for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, dewaxing, hydrodewaxing, oligomerization, aromatization, alcohol conversion reactions, the conversion of syngas into mixtures of hydrocarbons, and the like. When the catalyst or support contains the two zeolites and a porous, inorganic, refractory oxide component but no hydrogenation components, it is useful for any of a number of acid-catalyzed hydrocarbon conversion reactions in which hydrogen is not an added reactant, e.g., isomerization, alkylation, transalkylation, cracking, dewaxing, oligomerization, etc. However, since the main benefit of the invention as presently contemplated is in hydroprocessing such as hydrocracking, a process in which hydrogen is an added reactant, the catalyst for this purpose will further require one or more hydrogenation components, in which case the portion of the catalyst exclusive of any hydrogenation metal components is considered the support upon which the hydrogenation component(s) is dispersed.

Whether the zeolite-refractory oxide particulates are used as the catalyst itself or as the support (or support component) for hydrogenation metals, the amounts of the two zeolites and refractory oxide components present will normally depend on the particular process in which the particulates are used. For example, when used to selectively produce gasoline in a hydrocracking process, it is preferred that the zeolite-refractory oxide particulates contain at least 5 weight percent, more preferably at least 10 weight percent, and more preferably still, at least 20 weight percent of each of the zeolites described above and at least 5 weight percent, more preferably at least 10 weight percent, and more preferably still, at least 15 weight percent of one or more of the amorphous, porous, inorganic refractory oxides. The zeolite-refractory oxide particulates typically contain at least 35 weight percent, preferably at least 50 percent by weight, even more preferably between about 60 and 80 percent by weight, of the two zeolites, with at least 50 percent by weight, preferably at least 75 percent by weight, even more preferably at least 90 percent by weight, and most preferably 100 percent by weight of the balance being the one or more porous, inorganic refractory oxides. On the other hand, when the zeolite-refractory oxide particulates are used for selectively producing middle distillates in a hydrocracking process, they will typically contain less than 30 weight percent, preferably less than 20 weight percent and more preferably between 2.5 and 10 weight percent of each of the zeolites with at least 50 weight percent, preferably 100 weight percent, of the balance being an inorganic refractory oxide binder and diluent in combination. Typically, the combined amount of the two zeolites will comprise between about 5 and 50 weight percent, preferably between about 7 and 40 weight percent, and more preferably between about 8 and 20 weight percent, of the particulates. In a preferred embodiment, the weight ratio of the two zeolites in the particulates is 1:1; however, other weight ratios of zeolite Beta to the Y zeolites described above may also be used, e.g., in the ranges of 1.5:1 to 1:1.5, 2:1 to 1:2, 2.5:1 to 1:2.5, 3:1 to 1:3, etc.

For use in hydroprocessing, such as hydrocracking, the catalyst contains one or more hydrogenation components containing metals selected from the group consisting of Group VIB and/or Group VIII of the Periodic Table of Elements, such components typically being in the form of the free metals or their respective oxides and sulfides, the latter two being most preferred. As used herein "Periodic Table of Elements" refers to the version found in the inside front cover of the *Handbook of Chemistry and Physics,* 65th Edition, published in 1984 by the Chemical Rubber Company, Cleveland, Ohio. The platinum group (or noble) metals of the Group VIII metals may be used, but preference at present is for the base (or non-noble) metals, e.g., nickel and cobalt in particular, and nickel most preferably of all. Of the Group VIB metals, molybdenum and tungsten are preferred, with molybdenum being most preferred when the catalyst is to be used in gasoline hydrocracking and tungsten being most preferred when the catalyst is to be used in middle distillate hydrocracking. The most highly preferred catalyst contains both a non-noble Group VIII metal component and a Group VIB metal component, most preferably nickel and molybdenum or nickel and tungsten in combination.

The hydrocracking catalysts of the invention contain at least 0.2 weight percent of the hydrogenation components, calculated as the metals. If noble metals are used, the hydrogenation components are generally present in a relatively low proportion, e.g., 0.2 to 2 weight percent. For the base metals, the proportions are generally higher. The Group VIB metal component is generally employed in proportions of about 5 to 35 weight percent, preferably in the range of 8 to 30 weight percent, calculated as the respective trioxide. Non-noble Group VIII metal components are typically employed in proportions between about 2 and 15 weight percent, preferably between 3 and 10 percent by weight, calculated as the respective monoxide. It is to be understood that the proportions given above for the hydrogenation metal components are based on the finished catalyst whereas the proportions expressed above for the zeolites and amorphous inorganic refractory oxides are values in the absence of the hydrogenation metal component, i.e., for the support only. For purposes herein, the term "support" is defined as all materials in the catalyst except the hydrogenation metal components.

The hydrogenation components may be incorporated into the catalyst in any of many ways known in the art for combining hydrogenation components with supports composed of zeolites and refractory oxides. One such method is to first prepare the support, for example, as an extrudate, containing the zeolites and refractory oxide in calcined form, and then impregnating the support with solutions containing the desired metal(s) in dissolved form. Calcination at an elevated temperature, e.g., above 800° F., produces the desired catalyst containing metals in oxide form. Likewise, and in another embodiment, the desired metal(s) are introduced by comulling a compound containing such metal(s) in the zeolite-refractory oxide mixture previously described, followed by shaping (e.g., extrusion through a die), drying, and calcining, e.g., at a temperature above 900° F., to produce the oxide form of the catalyst. For one preferred catalyst, the comulling is effected with ammonium heptamolybdate as the source of molybdenum and nickel nitrate as the source of nickel, with both compounds generally being introduced into the mulling mixture in the form of an aqueous solution. Other metals can be similarly introduced in dissolved aqueous form; likewise, non-metallic elements, e.g., phosphorus, may be introduced by incorporating a soluble component such as phosphoric acids into the aqueous solution.

It will be noted in the above impregnation and comulling procedures that the final catalyst will inherently contain the hydrogenation metal distributed on both zeolites and the refractory oxide and, in either procedure, if the metal is introduced in dissolved form as a cation, some of the metal will exchange into the cation sites of the two zeolites. However, it is possible, in embodiments of the invention which are not presently preferred, that the hydrogenation metal(s) could be essentially selectively located on either of the zeolites or on both to the exclusion of the refractory oxide, or on the refractory oxide to the exclusion of the zeolites, or on one zeolite and the refractory oxide to the exclusion of the other zeolite. As an example, one could introduce the hydrogenation metal by cation exchange into the zeolites or by impregnation thereon if the metal is present in anionic form; subsequent comulling with the porous, inorganic refractory oxide, followed by shaping, drying, and calcining, would ultimately yield a catalyst containing the hydrogenation metals only on the zeolites. In direct contrast, one could comull the hydrogenation metal precursor with only the porous refractory oxide, and then add the zeolites to the comulling mixture; subsequent shaping, drying, and calcining steps yield a catalyst with the hydrogenation metal essentially exclusively on the porous, inorganic refractory oxide. Alternatively still, one could cation exchange and/or impregnate one of the zeolites with the desired metals, and likewise separately comull the metals with the porous refractory oxide, then comull the entire combination, shape, dry, and calcine as before but this time yielding a catalyst having the hydrogenation metals on one zeolite and on the porous, inorganic refractory oxide to the exclusion of the second zeolite. In addition, the preceding procedure can be modified such that no metals are comulled into the refractory oxide, thus providing a catalyst in which the hydrogenation component is essentially exclusively on one or the other of the two zeolites.

By the foregoing procedures or their equivalents, catalysts with the hydrogenation metals present in the oxide form are prepared in particulate form, with the majority of such particles, usually at least 90 weight percent, and preferably substantially all, individually containing both zeolites and one or more refractory oxides in a support for the hydrogenation component. The finished hydrocracking catalyst, when used to selectively produce gasoline, will typically comprise (1) between about 5 and 75 weight percent zeolite Beta, preferably between about 15 and 50 weight percent, (2) between about 5 and 75 weight percent, preferably between about 15 and 50 weight percent, Y zeolite having a unit cell size below about 24.45 angstroms and/or a water vapor sorption capacity at 25° C. and a $p/p_o$ value of 0.10 of less than 10.00 weight percent, (3) between about 5 and 25 weight percent porous, inorganic refractory oxide binder, preferably between about 10 and 20 weight percent, (4) between about 8 and 30 weight percent Group VIB metal hydrogenation component, preferably between about 10 and 25 weight percent and (5) between about 0.2 and 15 weight percent Group VIII metal hydrogenation component, preferably between about 0.5 and 10 weight percent. When used to selectively produce middle distillates, the hydrocracking catalyst will normally contain the same amount of binder and Group VIB and Group VIII metal hydrogenation components as set forth above but will generally contain an inorganic refractory oxide diluent, e.g., alumina or a dispersion of silica-alumina in an alumina matrix, in lieu of a portion of both zeolites. Thus, the catalyst will typically contain between about 1 and 25 weight percent each of zeolite Beta and the Y zeolite having the properties set forth above, preferably 2.5 to 15 weight percent of each, in addition to 40 to 80 weight percent of an inorganic, refractory oxide diluent, preferably about 40 to 70 weight percent.

Catalysts prepared in the oxide form as described above are generally converted to the sulfide form for hydrocracking purposes. This can be accomplished by presulfiding the catalyst prior to use at an elevated temperature, e.g., 300° to 700° F., with, for example, a mixture consisting of 10 volume percent $H_2S$ and 90 volume percent $H_2$. Alternatively, the catalyst can be presulfided ex situ by various sulfiding processes; as an illustration, see "Sulficat ®: Offsite Presulfiding of Hydroprocessing Catalysts from Eurecat" by J. H. Wilson and G. Berrebi, Catalysts 87, Studies in Surface Science and Catalysts #38 page 393. More preferably, the sulfiding is accomplished in situ, i.e., by using the catalyst in the oxide form to hydrocrack a hydrocarbon feedstock containing sulfur compounds under hydrocracking conditions, including elevated temperature and pressure and the presence of hydrogen.

Hydrocracking catalysts in accordance with the invention are useful in the conversion of a wide variety of hydrocarbon feedstocks to a hydrocarbon product of lower average boiling point and/or molecular weight. The feedstocks that may be subjected to hydrocracking by the method of the invention include all mineral oils and synthetic oils (e.g., shale oil, tar sand products, etc.) and fractions thereof. Illustrative feedstocks include straight run gas oils, vacuum gas oils, coker gas oils, and catcracker distillates. The typical hydrocracking feedstock, however, contains a substantial proportion of components, usually at least 50 percent by volume, often at least 75 percent by volume, boiling above the desired end point of the product, which end point, in the case of gasoline, will generally be in the range of about 380° to 420° F., and in the case of middle distillates, will typically be in the range of 650° to 700° F. Usually, the feedstock will also contain gas oil components boiling above 550° F., with highly useful results being achievable with feeds containing at least 30 percent by volume of components boiling between 600° and 1100° F.

For best results in hydrocracking, the catalyst of the invention will be employed as a fixed bed of catalytic particulates in a hydrocracking reactor vessel into which hydrogen and the feedstock are introduced and passed in a downwardly direction. Operating conditions in the reactor vessel are chosen so as to convert the feedstock into the desired product, which, in one preferred embodiment, is a hydrocarbon product containing a substantial proportion of gasoline components boiling, for example, in the 50° to 420° F. range. However, other products, such as middle distillates boiling in the 300° to 700° F. range, may also be desired on occasion, and conditions must be adjusted according to the product (or distribution of products) desired. The exact conditions required in a given situation will depend upon the nature of the feedstock, the particular catalyst composition utilized, and the desired product(s). In general, the conditions of operation for hydrocracking will fall into the following usual and preferred ranges:

TABLE I

| Conditions | Usual | Preferred |
|---|---|---|
| Temperature, °F. | 450–850 | 500–800 |
| °C. | 232–454 | 260–427 |
| Pressure, psig | 750–3500 | 1000–3000 |
| atm | 51–238 | 68–204 |
| LHSV, reciprocal hours | 0.3–5.0 | 0.5–3.0 |
| H$_2$/Feedstock, MSCF/bbl as measured at 60° F. (15.6° C.) and 1 atmosphere | 1–10 | 2–8 |

The foregoing Table I shows the suitable and preferred hydrocracking conditions for single stage or for each stage of a two stage operation (the latter being described more fully in U.S. Pat. No. 4,429,053). It will be understood, however, that the operating conditions in the two stages of the two stage process are not necessarily identical. In fact, as mentioned hereinbefore, the primary difference in conditions in the two hydrocracking reactor vessels of two stage operation is the presence of substantial ammonia, usually greater than about 2000 ppmv or higher in the first stage, and its essential absence, i.e. less than 200 ppmv and preferably less than about 20 ppmv, in the second, allowing for less severe conditions in the second stage. There may, however, be yet other differences in conditions in any particular situation.

The typical gas oil feedstock contains no more than about 15 volume percent, usually less than 10 volume percent, of constituents boiling in the 50° to 420° F. range. When gasoline is the desired product from such feeds, the hydrocracking operating conditions are selected to produce either or both of (1) at least a 35 volume percent yield, preferably at least a 45 volume percent yield, even more preferably at least a 50 volume percent yield, and most preferably of all at least a 65 volume percent yield of 185° to 420° F. gasoline product or (2) at least a 40 volume percent yield, preferably at least a 50 volume percent yield, more preferably at least a 60 volume percent yield, and most preferably of all at least a 70 volume percent yield of 50° to 420° F. product gasoline. On the other hand, when middle distillates are the desired product, the hydrocracking operation conditions are selected to produce at least a 50 volume percent yield, preferably at least a 65 volume percent yield, and most preferably at least a 80 volume percent yield of 300° to 700° F. middle distillate product.

Based on presently available data, the catalyst of the present invention as compared to a commercial gasoline hydrocracking catalyst containing a single steam-stabilized Y zeolite having a unit cell dimension of 24.55 angstroms provides for enhanced results when used for single stage operation or in either stage of the two stage process. In particular, the catalyst of the invention provides for much higher activity in both stages of the two stage process, a significant increase in the yield of gasoline boiling in the 50° to 185° F. range in both stages and greater yields of gasoline boiling in the 50° to 420° F. range, especially in the second stage. Available data also show that the catalyst of the invention is more active and selective for the production of middle distillates in single stage hydrocracking than a commercial catalyst now sold for midbarrel hydrocracking. These achievements, and others, are proven in the following examples, which are provided for illustrative purposes and not to limit the invention as defined by the claims.

EXAMPLE I

Catalyst 1

Catalyst 1 was prepared by comulling a mixture of 64 wt. % Beta zeolite having an overall silica-to-alumina mole ratio of about 26 and obtained from the PQ Corporation, 16 wt. % peptized Catapal ® alumina, sufficient nickel nitrate to provide 5 wt. % nickel (calculated as NiO) in the final catalyst and sufficient ammonium heptamolybdate to provide 15 wt. % molybdenum (calculated as MoO$_3$) in the final catalyst. The comulled mixture was then extruded into 1/16 inch diameter cylindrical particles of between ⅛ and ½ inch in length, dried and calcined at 900° F. The resulting catalyst contained the nickel and molybdenum in the proportions above specified on a support comprising 80 weight percent Beta zeolite and 20 weight percent alumina.

Catalyst 2

Catalyst 2 was prepared by comulling a mixture of 32 wt. % Beta zeolite, 32 wt. % LZ-10 zeolite having a 24.30 angstroms unit cell size, an effective pore size above 7.0 angstroms and an overall silica-to-alumina mole ratio of about 5.2, 16 wt. % peptized Catapal ® alumina, sufficient nickel nitrate to provide 5 wt. % nickel (calculated as NiO) in the final catalyst and sufficient ammonium heptamolybdate to provide 15 wt. % molybdenum (calculated as MoO$_3$) in the final catalyst. The comulled mixture was then extruded into 1/16 inch diameter cylindrical particles of between $\frac{1}{8}$ and $\frac{1}{2}$ inch in length, dried and calcined at 900° F. The resulting catalyst contained the nickel and molybdenum in the proportions above specified on a support comprising 40 weight percent Beta zeolite, 40 weight percent LZ-10 zeolite, and 20 weight percent alumina.

Catalyst 3

Catalyst 3 was prepared similarly to Catalyst 2 except that 32 wt. % LZY-82 zeolite having a unit cell size of about 24.55 angstroms, an effective pore size above 7.0 angstroms and an overall silica-to-alumina mole ratio of 5.7 was used in place of LZ-10 zeolite. The resulting catalyst contained the nickel and molybdenum in the proportions above specified for Catalyst 2 on a support comprising 40 weight percent Beta zeolite, 40 weight percent LZY-82 zeolite, and 20 weight percent alumina.

Catalyst 4

Catalyst 4 is a sample of a commercial gasoline hydrocracking catalyst obtained from UOP. It was prepared similarly to Catalyst 1 except that 64 wt. % LZY-82 zeolite of unit cell size of about 24.55 angstroms was used in place of the Beta zeolite. The catalyst contained nickel and molybdenum in the proportions above specified for Catalyst 1 on a support comprising 80 weight percent LZY-82 zeolite and 20 weight percent alumina.

Catalyst 5

Catalyst 5 was prepared similarly to Catalyst 1 except that 64 wt. % LZ-10 zeolite having a 24.30 angstroms unit cell size was used in place of zeolite Beta. The resulting catalyst contained the nickel and molybdenum in the proportions above specified for Catalyst 1 on a support comprising 80 weight percent zeolite Beta and 20 weight percent alumina.

Catalyst 6

Catalyst 6 was prepared similarly to Catalyst 2 except 24 wt. % Beta zeolite was used instead of 32 wt. % and 40 wt. % LZ-10 zeolite was used instead of 32 wt. %. The resulting catalyst contained the nickel and molybdenum in the proportions above specified for Catalyst 2 on a support comprising 30 weight percent zeolite Beta, 50 weight percent LZ-10 zeolite and 20 weight percent alumina.

Catalyst 7

Catalyst 7 was prepared similarly to Catalyst 2 except 40 wt. % Beta zeolite was used instead of 32 wt. % and 24 wt. % LZ-10 zeolite was used instead of 32 wt. %. The resulting catalyst contained the nickel and molybdenum in the proportions above specified for Catalyst 2 on a support comprising 50 weight percent zeolite Beta, 30 weight percent LZ-10 zeolite and 20 weight percent alumina.

Catalyst 8

Catalyst 8 was prepared similarly to Catalyst 2 except that sufficient nickel nitrate was used to provide 10 wt. % nickel (calculated an NiO) in the final catalyst and sufficient ammonium heptamolybdate was used to provide 10 wt. % molybdenum (calculated as MoO$_3$) in the final catalysts.

Each of the above-described eight catalysts was presulfided by passing a gas stream consisting of 10 volume percent H$_2$S and the balance H$_2$ through a bed of the catalyst at a temperature initially of about 300° F. and slowly increased to 700° F. and held at that temperature for about 1 hour.

The eight catalysts were compared for hydrocracking activity and selectivity (i.e., product yields) in both simulated first and second stage testing. Specifically, the eight catalysts were separately tested for hydrocracking a hydrotreated, partially hydrocracked vacuum gas oil feed having an API gravity of 38.7°, an initial boiling point of 373° F., a final boiling point of 807° F., and a 50 percent boiling point of 568° F., with about 8 volume percent boiling below 400° F., as determined by a modified ASTM D1160 distillation.

Each catalyst was first tested for simulated second stage operation in the absence of ammonia by passing the feedstock through a laboratory size reactor vessel containing 150 milliliters of the catalyst at a total pressure of 1450 psig, a liquid hourly space velocity of 1.7 reciprocal hours, and a hydrogen feed rate of 8000 scf/bbl as measured at 60° F. In addition, sufficient thiophene was added to the feed to provide a hydrogen sulfide concentration equivalent to 0.5 weight percent sulfur and thereby simulate a hydrogen sulfide-containing atmosphere as it exists in commercial second stage hydrocracking reactors. The temperature conditions were adjusted as necessary to maintain a product of 49.5° API gravity, which, by previously established correlations, corresponds to about a 60 volume percent yield of gasoline-type materials boiling below 420° F., over the course of 100 hours. At the end of the 100 hours, the temperature required to maintain the product was recorded, and using Catalyst 4 as a reference, the activity and selectivity of each catalyst relative to this catalyst were calculated. These comparative data, and other data relative to the second stage simulation, are summarized in Tables II and III below.

After the second stage simulation, the conditions in the reactor vessel were altered for first stage simulation under ammonia-rich conditions, in particular, by adding, along with the thiophene, sufficient tert-butyl amine to the feed to provide an ammonia concentration equivalent to 0.2 weight percent nitrogen and adjusting the temperature to maintain production of a liquid product of 47.0° API gravity, which, by previously established correlations, corresponds to about a 40 percent yield of gasoline-type products boiling below 420° F. Again, after a further 100 hours operation, data were recorded comparing the catalysts against the performance of Catalyst 4 as a reference, the data being summarized in the following Tables II and III.

Table II below compares the results obtained for Catalysts 1 through 5 in the simulated first and second stage hydrocracking operations described above.

TABLE II

| Catalyst Designation: | 1 | 2 | 3 | 4** | 5 | *** |
|---|---|---|---|---|---|---|
| Composition, wt. % | | | | | | |

TABLE II-continued

| Catalyst Designation: | 1 | 2 | 3 | 4** | 5 | *** |
|---|---|---|---|---|---|---|
| LZ-10 | — | 32 | — | — | 64 | — |
| Zeolite Beta | 64 | 32 | 32 | — | — | — |
| LZY-82 | — | — | 32 | 64 | — | — |
| Second Stage: | | | | | | |
| Activity, °F. | −42 | −20 | −46 | 0 | +44 | +1.0 |
| 420° F.- conversion, vol. % | +6.6 | +6.7 | +6.4 | 0 | +0.8 | +3.7 |
| $C_1$-$C_3$ yield, scf/bbl | −8.3 | −5.5 | −0.1 | 0 | +0.2 | −4.1 |
| $C_4$ yield, vol. % | +1.4 | −2.5 | −0.9 | 0 | −3.5 | −1.0 |
| 50–185° F. fraction $C_5$-$C_6$ yield, vol. % | +10.6 | +8.3 | +8.9 | 0 | +2.0 | +6.3 |
| 185–420° F. fraction yield, vol. % | −3.9 | −0.1 | −0.4 | 0 | +1.6 | −1.2 |
| cycloparaffin, wt. % | −17.8 | −16.0 | −16.5 | 0 | −1.2 | −9.5 |
| octane, (R + M)/2 | −4.4 | −4.7 | — | 0 | −2.8 | −3.6 |
| 50–420° F. yield, vol. % | +6.7 | +8.2 | +8.5 | 0 | +3.6 | +5.2 |
| 300–550° F. fraction yield, vol. % | −3.3 | +2.0 | +1.1 | 0 | +6.4 | +1.6 |
| First Stage: | | | | | | |
| Activity, °F. | −31 | −11 | −13 | 0 | +21 | −5.0 |
| 420° F.- conversion, vol. % | +4.4 | +1.1 | +0.8 | 0 | −1.5 | +1.5 |
| $C_1$-$C_3$ yield, scf/bbl | +6.7 | −0.5 | −2.8 | 0 | +2.3 | +4.5 |
| $C_4$ yield, vol. % | +0.5 | −0.5 | −2.2 | 0 | −2.4 | −1.0 |
| 50–185° F. fraction $C_5$-$C_6$ yield, vol. % | +8.1 | +4.4 | +4.3 | 0 | +1.2 | +4.7 |
| 185–420° F. fraction yield, vol. % | −3.6 | −1.5 | −1.6 | 0 | −0.3 | −2.0 |
| cycloparaffin, wt. % | −12.6 | −9.1 | −7.8 | 0 | −2.9 | −7.8 |
| octane (R + M)/2 | −6.5 | −5.0 | — | 0 | −3.6 | −5.0 |
| 50–420° F. yield, vol. % | +4.5 | +2.9 | +2.7 | 0 | +0.9 | +2.7 |
| 300–550° F. fraction yield, vol. % | −4.2 | +1.4 | +0.6 | 0 | +3.4 | −0.4 |

**Catalyst 4 is used as a reference to evaluate the performance of Catalysts 1 through 3 and 5. Thus, the first and second stage activity and yield data for Catalyst 4 are entered as zeroes while the data for Catalysts 1 through 3 and 5 are entered as the difference between the actual value for activity or yield of the catalyst minus the actual value for activity or yield obtained with Catalyst 4. The more negative the value for activity, the more active is the catalyst.

***This column contains the calculated average of the data for Catalysts 1 and 5.

As shown in Table II, the catalytic activity of Catalyst 2, a catalyst of the invention containing a combination of zeolite Beta and LZ-10 zeolite having a unit cell size of 24.30 angstroms, is substantially greater than that of the reference commercial catalyst, i.e., Catalyst 4, in both simulated first and second stage hydrocracking. Catalyst 2 is 11° F. more active than Catalyst 4 in the first stage and 20° F. more active in the second stage. Catalyst 2 also shows significant advantages over the commercial catalyst with respect to yields of light gasoline, the 50°–185° F. boiling fraction, in both first (+4.4 volume percent) and second stage (+8.3 volume percent) simulated hydrocracking while maintaining approximately equivalent yields of heavy gasoline, the 185°–420° F. boiling fraction, in the second stage. Also, the catalyst of the invention yields slightly higher amounts of turbine fuel, the 300°–550° F. boiling fraction, as compared to the commercial catalyst; i.e., +1.4 and +2.0 volume percent in the first and second stages, respectively.

The catalyst of the invention also compares favorably in activity and light gasoline yield to Catalyst 5, which contains LZ-10 zeolite and no other zeolite. Catalyst 2 is 32° F. [−11 -(+21)] more active and yields 3.2 volume percent (4.4-1.2) more light gasoline in the first stage and is 64° F. [−20 -(+44)] more active and yields 6.3 volume percent (8.3-2.0) more gasoline in the second stage.

A comparison of the catalyst of the invention to Catalyst 1, which contains zeolite Beta and no other zeolite, shows that Catalyst 1 has superior first and second stage activities and produces more light gasoline in both stages. The catalyst of the invention, however, yields greater quantities of heavy gasoline, the 185°–420° F. boiling fraction, in both stages and gives much higher yields of turbine fuel; i.e., 5.6 volume percent [1.4 -(−4.2)] in the first stage and 5.3 volume percent [2 -(−3.3)] in the second stage.

It would appear from comparing the data for Catalyst 2 with that of Catalyst 3, which is similar to Catalyst 2 but contains LZY-82 zeolite, a steam-stabilized zeolite having a unit cell size of 24.55 angstroms, in place of LZ-10 zeolite, that the performance in simulated first stage hydrocracking is about the same. There is little difference in activity and selectivity to both light and heavy gasoline with the total yield of both light and heavy gasoline, the 50°–420° F. boiling fraction, being +2.9 volume percent for Catalyst 2 and +2.7 volume percent for Catalyst 3. Catalyst 2 does appear somewhat better from the standpoint of making turbine fuel by giving an 0.8 volume percent (1.4-0.6) greater yield. Another advantage of Catalyst 2 appears to be the production in simulated second stage hydrocracking of less $C_1$-$C_3$ gases (−5.5 versus −0.1 scf/bbl) and more turbine fuel (+2.0 versus +1.1 volume percent).

As pointed out above, Catalyst 1 contains 64 weight percent Beta zeolite and no other zeolite while Catalyst 5 contains 64 weight percent LZ-10 zeolite and no other zeolite. The last column in Table II contains the calculated average of the activity and selectivity data for Catalysts 1 and 5. These averages represent the activities and selectivities that one of ordinary skill in the art would expect to be obtained with a catalyst containing a mixture of 32 weight percent Beta zeolite and 32 weight percent LZ-10 zeolite. Since Catalyst 2, a catalyst of the invention, contains Beta zeolite and LZ-10 zeolite in just such proportions, the activity and selectivity data for Catalyst 2 represents actual measured values which can be directly compared to the expected values in the last column of the table. Such a comparison shows that the actual measured activities are unexpectedly superior to those expected if the effects of the two zeolites were additive. The actual first stage activity is 6° F. [−11 -(−5.0)] more than expected while the second stage activity is 21° F. [−20 -(1.0)] greater than expected. The same type of results is seen for total gasoline and turbine fuel yield in both stages; the actual yields of these liquids being greater than expected. The above discussed data clearly establish that the activities and selectivities attributed to zeolite Beta and LZ-10 zeolite are not additive and that, when the two components appear together in the same matrix, a synergism occurs which renders the catalyst more active and selective than could possibly be predicted from the activities and selectivities attributable to each zeolite alone.

In summary, as to the data in Table II, it has been found that Catalyst 2 containing an equal mixture of zeolite Beta and an LZ-10 zeolite having a unit cell size of 24.30 angstroms is superior in selectivity for producing light gasoline and in activity in both first and second stage hydrocracking to a current commercial catalyst (Catalyst 4) containing LZY-82 zeolite as the only zeolite therein. In addition, the activities and selectivities measured for Catalyst 2 clearly represents synergistic and unexpected results when compared to the activities and selectivities predicted from measured activities and selectivities for a catalyst containing LZ-10 zeolite as its only zeolite and a catalyst containing zeolite Beta as its only zeolite.

Table III below compares the results obtained for Catalysts 2 and 6 through 8 in the simulated first and second stage hydrocracking operations described above.

TABLE III

| Catalyst Designation: | 2 | 4** | 6 | 7 | 8*** |
|---|---|---|---|---|---|
| Composition, wt. % | | | | | |
| LZ-10 | 32 | — | 40 | 24 | 32 |
| Zeolite Beta | 32 | — | 24 | 40 | 32 |
| LZY-82 | — | 64 | — | — | — |
| Second Stage: | | | | | |
| Activity, °F. | −20 | 0 | −17 | −28 | −42 |
| 420° F.- conversion, vol. % | +6.7 | 0 | +8.2 | +5.7 | +6.1 |
| $C_1$-$C_3$ yield, scf/bbl | −5.5 | 0 | +15.5 | +3.3 | +2.5 |
| $C_4$ yield, vol. % | −2.5 | 0 | +0.6 | −0.1 | +0.8 |
| 50–185° F. fraction $C_5$-$C_6$ yield, vol. % | +8.3 | 0 | +7.2 | +8.7 | +8.2 |
| 185–420° F. fraction yield, vol. % | −0.1 | 0 | +1.1 | −2.6 | −1.9 |
| cycloparaffin, wt. % | −16.0 | 0 | −15.8 | −17.1 | −18.0 |
| octane, (R + M)/2 | −4.7 | 0 | −4.5 | −5.2 | −3.9 |
| 50–420° F. yield, vol. % | +8.2 | 0 | +8.3 | +6.1 | +7.3 |
| 300–550° F. fraction yield, vol. % | +2.0 | 0 | +2.1 | −0.7 | +0.6 |
| First Stage: | | | | | |
| Activity, °F. | −11 | 0 | −2 | −12 | −18 |
| 420° F.- conversion, vol. % | +1.1 | 0 | +3.2 | +0.6 | −0.4 |
| $C_1$-$C_3$ yield, scf/bbl | −0.5 | 0 | +12.5 | +11.7 | +6.1 |
| $C_4$ yield, vol. % | −0.5 | 0 | −0.8 | −1.8 | −1.0 |
| 50–185° F. fraction $C_5$-$C_6$ yield, vol. % | +4.4 | 0 | +4.2 | +5.4 | +4.7 |
| 185–420° F. fraction yield, vol. % | −1.5 | 0 | +0.4 | −3.6 | −4.1 |
| cycloparaffin, wt. % | −9.1 | 0 | −7.3 | −9.3 | −10.8 |
| octane (R + M)/2 | −5.0 | 0 | −5.0 | −5.2 | −6.6 |
| 50–420° F. yield, vol. % | +2.9 | 0 | +4.6 | +1.8 | +0.6 |
| 300–550° F. fraction yield, vol. % | +1.4 | 0 | +1.9 | −1.3 | −0.4 |

**Catalyst 4 is used as a reference to evaluate the performance of Catalysts 2 and 6 through 8. Thus, the first and second stage activity and yield data for Catalyst 4 are entered as zeroes while the data for Catalysts 2 and 6 through 8 are entered as the difference between the actual value for activity or yield of the catalyst minus the actual value for activity or yield obtained with Catalyst 4.
***Catalst 8 contains 10 weight percent nickel (calculated as NiO) and 10 weight percent molybdenum (calculated as $MoO_3$). All other catalysts contain 5 weight percent nickel and 15 weight percent molybdenum calculated in the same manner.

Catalysts 6 and 7 differ from Catalyst 2 in that they contain different amounts of LZ-10 zeolite and zeolite Beta. Catalyst 6 contains 40 weight percent LZ-10 zeolite and 24 weight percent zeolite Beta while Catalyst 7 contains 40 weight percent zeolite Beta and 24 weight percent LZ-10 zeolite. By comparing the activities and selectivities of these three catalysts, it is seen that, as the concentration of zeolite Beta in the catalysts increases, the activity in both stages increases. For example, in the second stage the activity increases from −17° F. for Catalyst 6 to −20° F. for Catalyst 2 to −28° F. for Catalyst 7. A similar trend is observed for the light gasoline yield (50°–185° F. boiling fraction) in both stages. In the second stage, for example, the light gasoline yield increases from +7.2 volume percent for Catalyst 6 to +8.3 volume percent for Catalyst 2 to +8.7 volume percent for Catalyst 7. The yield of heavy gasoline (185°–420° F. boiling fraction) and turbine fuel (300°–550° F. boiling fraction) decreases with increasing content of zeolite Beta in both stages. For example, the heavy gasoline in the second stage drops from +1.1 volume percent for Catalyst 6 to −0.1 volume percent for Catalyst 2 to −2.6 volume percent for Catalyst 7. Similarly, the turbine fuel yield in the second stage drops from +2.1 volume percent for Catalyst 6 to +2.0 volume percent for Catalyst 2 to −0.7 volume percent for Catalyst 7.

Catalyst 8 is similar to Catalyst 2 but contains 10 weight percent nickel (calculated as NiO) instead of 5 weight percent and 10 weight percent molybdenum (calculated as $MoO_3$) instead of 15 weight percent. A comparison of the activity data for both catalysts indicates that increasing the concentration of nickel in the catalyst results in significant increases in activity in both simulated first and second stage operations. Catalyst 8 is 7° F. [−18-(−11)] more active in first stage hydrocracking and 22° F. [−42-(−20)] more active in second stage hydrocracking. The increase in nickel concentration, however, appears to decrease the yield of turbine fuel (300°–500° F. boiling fraction) and total gasoline (50°–420° F. boiling fraction) in both first and second stage operations.

EXAMPLE II

Catalyst 9

Catalyst 9, a catalyst of the invention, was prepared by mixing 5 weight percent of the same LZ-10 zeolite and the same Beta zeolite used to make Catalyst 2 with 70 weight percent of a dispersion of silica-alumina particles in a gamma alumina matrix, which dispersion contained about 55 weight percent alumina and about 45 weight percent silica, and 20 weight percent peptized Catapal ® alumina binder. The mixture was mulled and then extruded through a 1/16 inch cylindrical die to form cylindrical extrudates that were cut into ⅜ to ½ inch lengths. The extrudates were dried at 230° F. and then calcined at 900° F. The dried and calcined extrudates were then impregnated via the pore saturation method with an aqueous solution containing nickel nitrate and ammonium metatungstate in sufficient quantities such that, after the impregnated extrudates were dried at 230° F. and calcined at 900° F., the resultant catalyst particles contained about 5 weight percent nickel, calculated as NiO, and about 22 weight percent tungsten, calculated as $WO_3$, on a support comprising 5 weight percent LZ-10 zeolite, 5 weight percent zeolite Beta, 70 weight percent dispersion and 20 weight percent alumina binder.

Catalyst 10

Catalyst 10 is a sample of a commercial middle distillate hydrocracking catalyst obtained from UOP. It was prepared similarly to Catalyst 9 except 10 weight percent LZ-10 zeolite was used instead of 5 weight percent each of zeolite Beta and LZ-10 zeolite. The catalyst contained about 5 weight percent nickel, calculated as NiO, and about 22 weight percent tungstun, calculated as $WO_3$, on a support comprising 10 weight percent LZ-10 zeolite, 70 weight percent dispersion of silica-alumina particles in a gamma alumina matrix and 20 weight percent alumina binder.

Catalysts 9 and 10 were presulfided as described in Example I and then tested for activity and selectivity in middle distillate hydrocracking using a light Arabian vacuum gas oil having an API gravity of 23.0°, an initial boiling point of 494° F., a final boiling point of 1048° F., and a 50 percent boiling point of 844° F., with about 20 volume percent boiling below 786° F., as determined by a modified ASTM D 1160 distillation. The gas oil, which contained 0.085 weight percent nitrogen, calculated as the element, and 2.1 weight percent sulfur calculated as the element, was passed on a once-through basis through an isothermal reactor containing about 140 milliliters of the catalyst mixed with 95 milliliters of 6 to 8 mesh quartz. The reactor was operated at a liquid hourly space velocity (LHSV) of 1.0 reciprocal hour, a total pressure of 2,000 psig and a once-through hydrogen flow rate of 10,000 standard cubic feet per barrel. The temperature of the reactor was adjusted periodically to maintain a total liquid product API gravity of 39.0°, which, by previously established correlations, corresponds to about a 60 volume percent yield of materials boiling below 700° F. The results of these tests are set forth in Table IV below.

TABLE IV

| Catalyst Designation | Composition of Support (Wt. %) | Activity Reactor Temp. to Provide 60% Conversion | Selectivity Vol. % Converted to | |
|---|---|---|---|---|
| | | | Turbine 300–550° F. | Diesel 300–700° F. |
| 9 | 70% silica-alumina in alumina 20% binder 5% LZ-10 zeolite 5% Beta zeolite | 738° F. | 82.9 | 88.6 |
| 10 | 70% silica-alumina in alumina 20% binder 10% LZ-10 | 754° F. | 79.5 | 85.6 |

As can be seen from the data in Table IV, the catalyst of the invention, i.e., catalyst 9, is 16° F. (738° F. vs. 754° F.) more active than the commercial catalyst, i.e., Catalyst 10. This differential in activity temperature represents about a 50 percent improvement in activity which means that the catalyst of the invention can be used for hydrocracking a given feedstock under the same operating conditions as the commercial catalyst but at a feed rate that is 50 percent higher. Alternatively, the catalyst of the invention could be used to produce the same conversion as the commercial catalyst at the same feed rate but initially at a temperature 16° F. lower. This temperature differential represents a significant savings in fuel when using the catalyst of the invention as compared to the commercial catalyst. In addition to possessing an increased activity over the commercial catalyst, the catalyst of the invention also has a higher selectivity for components boiling in the turbine fuel range of 300° to 550° F. (82.9 vs. 79.5 volume percent) and a higher selectivity for components boiling in the diesel fuel range of 300° to 700° F. (88.6 vs. 85.6 volume percent).

Although the invention has been described in conjunction with comparative examples and by reference to the preferred embodiments thereof, it is evident that many alternatives, modifications, and variations will be apparent to those skilled in the art in light of the foregoing description. Accordingly, it is intended in the invention to embrace these and all such alternatives, variations, and modifications as may fall within the spirit and scope of the appended claims.

I claim:

1. A process for hydrocracking a hydrocarbon feedstock which comprises contacting said feedstock under hydrocracking conditions in an atmosphere containing no more than about 200 ppmv ammonia with a catalyst devoid of a nonzeolitic molecular sieve and comprising a hydrogenation component, zeolite Beta, and between about 15 and 50 weight percent of a Y zeolite having a unit cell size between about 24.20 and 24.35 angstroms and a water vapor sorption capacity at 25° C. and a $p/p_o$ value of 0.10 of less than about 10 weight percent.

2. The process of claim 1 carried out in an atmosphere which contains no more than about 20 ppmv ammonia.

3. The process of claim 1 wherein said Y zeolite has a unit cell size between about 24.25 and 24.35 angstroms.

4. The process of claim 1 wherein said catalyst comprises both a Group VIB metal hydrogenation component and a Group VIII metal hydrogenation component.

5. The process of claim 4 wherein said Group VIB metal hydrogenation component is selected from the group consisting of molybdenum, tungsten, and the oxides and sulfides thereof and said Group VIII metal hydrogenation component is selected from the group consisting of nickel, cobalt, and the oxides and sulfides thereof.

6. The process of claim 1 wherein said catalyst further comprises an inorganic refractory oxide.

7. The process of claim 6 wherein said inorganic refractory oxide comprises alumina.

8. The process of claim 1 wherein said catalyst contains between about 20 and 40 weight percent of said Y zeolite.

9. The process of claim 1 wherein said catalyst contains a nickel hydrogenation component and a molybdenum hydrogenation component.

10. The process of claim 9 carried out in an atmosphere which contains no more than about 20 ppmv ammonia.

11. A hydrocracking process as defined by claim 1 wherein said Y zeolite has a unit cell size between about 24.25 and 24.35 angstroms and a water vapor sorption capacity at 4.6 mm water vapor partial pressure and 25° C. less than 8.0 percent by weight of the zeolite.

12. A process as defined by claim 1 wherein said Y zeolite is prepared by a process comprising the four steps of (1) partially ammonium exchanging a sodium Y zeolite, (2) calcining the resultant zeolite in the presence of water vapor, (3) ammonium exchanging the zeolite a second time, and (4) calcining the zeolite from step (3) in the presence of water vapor.

13. The process of claim 12 wherein the zeolite is prepared such that in step (1) the sodium Y zeolite is reduced in sodium content to between about 0.6 and 5 weight percent, calculated as $Na_2O$, in step (2) a steam atmosphere is employed and the unit cell size of the zeolite is reduced to a value between about 24.45 to 24.64 angstroms, in step (3) the ammonium exchange reduces the sodium content to below about 0.6 weight percent, calculated as $Na_2O$, and in step (4) the calcination is conducted in the presence of steam and the unit cell size of the zeolite after calcination is less than about 24.35 angstroms.

14. A hydrocracking process comprising contacting a hydrocarbon feedstock with a catalyst under hydrocracking conditions in the presence of hydrogen and in an atmosphere which contains no more than about 200 ppmv ammonia so as to produce a product of lower average boiling point, said catalyst being devoid of a nonzeolitic molecular sieve and comprising one or more hydrogenation components in combination with a support comprising an inorganic refractory oxide, zeolite Beta in a form catalytically active for cracking hydrocarbons, and a Y zeolite catalytically active for cracking hydrocarbons, said Y zeolite having a unit cell size between about 24.20 and 24.35 angstroms and a water vapor sorption capacity at 25° C. and $p/p_o$ value of 0.10 of less than about 10 weight percent, wherein said catalyst contains between about 15 and 50 weight percent of said Y zeolite.

15. The hydrocracking process of claim 14 wherein said zeolite has a unit cell size between about 24.25 and 24.35 angstroms.

16. The hydrocracking process of claim 14 wherein said hydrogenation components comprise components selected from the group consisting of Group VIB and Group VIII metals and compounds thereof.

17. The hydrocracking process of claim 16 wherein said hydrogenation component comprises a noble metal.

18. The hydrocracking process of claim 16 wherein said catalyst comprises both a Group VIB and a Group VIII base metal hydrogenation component.

19. The hydrocracking process of claim 18 wherein said catalyst comprises a Group VIB hydrogenation component selected from the group consisting of molybdenum, tungsten, and the oxides and sulfides thereof and a Group VIII non-noble metal hydrogenation component selected from the group consisting of nickel, cobalt, and the oxides and sulfides thereof.

20. The hydrocracking process of claim 19 wherein the two zeolites are present in said catalyst in a weight ratio between 2:1 and 1:2, Beta zeolite to Y zeolite.

21. The hydrocracking process of claim 14 wherein the product comprises at least 50 volume percent gasoline product boiling in the 50° to 420° F. range, the feedstock containing no more than about 15 volume percent of such gasoline product.

22. The hydrocracking process of claim 14 wherein said catalyst comprises one or more nickel hydrogenation components and one or more molybdenum hydrogenation components.

23. The hydrocracking process of claim 22 wherein said support contains at least 20 weight percent of each zeolite.

24. The hydrocracking process of claim 22 carried out in an atmosphere which contains no more than about 20 ppmv ammonia.

25. The hydrocracking process of claim 14 wherein said Beta zeolite is in the hydrogen form, has a silica-to-alumina molar ratio between 20 and 30, a crystal size between about 0.1 and 0.7 um, a surface area between 700 and 750 m²/gm, and a sodium content less than 1.0 percent by anhydrous weight, calculated as $Na_2O$.

26. The hydrocracking process of claim 14 wherein said catalyst is essentially devoid of noble metals.

27. The hydrocracking process of claim 14 wherein said support contains the zeolite Beta and the Y zeolite as the only zeolites therein, and the balance consists essentially of alumina in essentially the gamma alumina form, said alumina comprising at least 10 percent by weight of the support.

28. The hydrocracking process of claim 14 carried out in an atmosphere which contains no more than about 20 ppmv ammonia.

29. The hydrocracking process of claim 14 wherein said catalyst is devoid of rare earth metals.

30. The hydrocracking process of claim 14 wherein said catalyst is devoid of an ultrastable Y zeolite, a rare earth-exchanged Y zeolite, ZSM-4 zeolite, ZSM-18 zeolite and ZSM-20 zeolite.

31. The hydrocracking process of claim 14 wherein said catalyst is devoid of a molecular sieve having a pore size below 7.0 angstroms.

32. The hydrocracking process of claim 14 wherein said Y zeolite is LZ-10 zeolite.

33. The hydrocracking process of claim 14 wherein said inorganic refractory oxide comprises alumina.

34. The hydrocracking process of claim 14 wherein said catalyst contains between about 20 and 40 weight percent of said Y zeolite.

35. A hydrocracking process comprising contacting a gas oil feedstock with a catalyst under hydrocracking conditions in the presence of hydrogen and in an atmosphere which contains no more than about 200 ppmv ammonia so as to produce a product of lower average boiling point, said catalyst being devoid of a nonzeolitic molecular sieve and comprising one or more hydrogenation components in combination with a support comprising an inorganic refractory oxide binder, zeolite Beta in a form catalytically active for cracking hydrocarbons, and LZ-10 zeolite, the LZ-10 zeolite having a unit cell size between about 24.25 and 24.35 angstroms and a water vapor sorption capacity at 4.6 mm water vapor partial pressure and 25° C. of less than about 8.0 percent by weight of the zeolite, wherein said catalyst contains between about 15 and about 50 weight percent of said LZ-10 zeolite.

36. The hydrocracking process of claim 35 wherein the two zeolites are present in said catalyst in a weight ratio between 2:1 and 1:2, Beta zeolite to LZ-10 zeolite, and the hydrogenation component comprises a molybdenum component present in the catalyst in a proportion between about 8 and 30 weight percent, calculated as $MoO_3$, and a nickel component in a proportion between about 3 and 10 weight percent, calculated as NiO, and wherein said Beta zeolite is in the hydrogen form, has a silica-to-alumina molar ratio between 20 and 30, a crystal size between about 0.1 and 0.7 um, a surface area between 700 and 750 $m^2$/gm, and a sodium content less than 1.0 percent by anhydrous weight, calculated as $Na_2O$, and wherein said support comprises at least 50 weight percent of the Beta and LZ-10 zeolites combined, and wherein said support comprises at least 20 weight percent of each of the LZ-10 and Beta zeolites, and wherein the product comprises at least 70 volume percent gasoline boiling in the 50° to 420° F. range.

37. The hydrocracking process of claim 35 wherein said catalyst contains between about 20 and 40 weight percent of said LZ-10 zeolite.

38. The hydrocracking process of claim 35 carried out in an atmosphere which contains no more than about 20 ppmv ammonia.

* * * * *

UNITED STATES PATENT AND TRADEMARK OFFICE
CERTIFICATE OF CORRECTION

PATENT NO. : 5,350,501
DATED : September 27, 1994
INVENTOR(S) : John W. Ward

It is certified that error appears in the above-indentified patent and that said Letters Patent is hereby corrected as shown below:

Title Page, item [75], column 1, after "Inventor:" change "John J. Ward" to -- John W. Ward --.

Title Page, item [56], column 1, line 18 under "U.S. PATENT DOCUMENTS" change "Olek et al." to -- Oleck et al. --; line 20 under "U.S. PATENT DOCUMENTS" change "Olecketal" to -- Oleck et al. --.

Column 21, claim 12, line 30, after "A" and before "process" insert --hydrocracking --; claim 15, line 67, after "said" and before "zeolite" insert -- Y --.

Signed and Sealed this

Twenty-seventh Day of December, 1994

Attest:

BRUCE LEHMAN

*Attesting Officer*     *Commissioner of Patents and Trademarks*